United States Patent [19]

Hauk et al.

[11] Patent Number: 4,545,048

[45] Date of Patent: Oct. 1, 1985

[54] SERVICE INTEGRATED DIGITAL TRANSMISSION SYSTEM

[75] Inventors: Waldemar Hauk, Backnang; Klaus Krull, Weissach; Manfred Welzenbach, Backnang, all of Fed. Rep. of Germany

[73] Assignee: Licentia Patent-Verwaltungs-GmbH, Frankfurt am Main, Fed. Rep. of Germany

[21] Appl. No.: 325,188

[22] Filed: Nov. 27, 1981

[30] Foreign Application Priority Data

Nov. 27, 1980 [DE] Fed. Rep. of Germany ....... 3044657

[51] Int. Cl.[4] ................................................. H04B 9/00
[52] U.S. Cl. ........................................ 370/1; 370/3; 370/71; 455/607; 455/612
[58] Field of Search ................. 455/2, 5, 606, 607, 455/608, 610, 612, 617, 618; 370/1, 3, 71, 73; 371/66; 358/84, 85; 364/200, 900; 375/58

[56] References Cited

U.S. PATENT DOCUMENTS

| | | | |
|---|---|---|---|
| 3,453,601 | 7/1969 | Bogert et al. | 364/200 |
| 3,601,544 | 8/1971 | Murphy | 179/15 |
| 3,651,471 | 3/1972 | Haselwood et al. | 455/2 |
| 3,941,989 | 3/1976 | McLaughlin et al. | 364/900 |
| 4,051,363 | 9/1977 | Fish | 455/608 |
| 4,061,577 | 12/1977 | Bell | 370/3 |
| 4,070,572 | 1/1978 | Hayes | 455/612 |
| 4,168,401 | 9/1979 | Molleron et al. | 179/15 AT |
| 4,229,830 | 10/1980 | Ryan | 455/608 |

FOREIGN PATENT DOCUMENTS

| | | |
|---|---|---|
| 0012979 | 12/1979 | European Pat. Off. |
| 0020878 | 3/1980 | European Pat. Off. |
| 0051725 | 9/1981 | European Pat. Off. |
| 2262933 | 6/1974 | Fed. Rep. of Germany |
| 2431037 | 7/1976 | Fed. Rep. of Germany |
| 2527323 | 1/1977 | Fed. Rep. of Germany |
| 2538638 | 3/1977 | Fed. Rep. of Germany |
| 2814415 | 10/1978 | Fed. Rep. of Germany |
| 2845023 | 5/1979 | Fed. Rep. of Germany |
| 2828624 | 1/1980 | Fed. Rep. of Germany |
| 2951480 | 7/1981 | Fed. Rep. of Germany |
| 147844 | 11/1980 | Japan ........................... 455/612 |
| 2006574 | 5/1979 | United Kingdom |

OTHER PUBLICATIONS

Helliwell et al.—Optical Fiber Transmission—Intern. Symposium on Subscriber Loops and Services—Mar. 1978—pp. 39–43.

Bosik—The Case in Favor of Burst Mode Transmission for Digital Subscriber Loops—Bell Labs.—pp. 26–30.

Waldhauer—Quantized Feedback in an Experimental 280-Mb/s Digital Repeater for Coaxial Transmission—IEEE Trans. on Comm., vol. Comm., No. 1, Jan. 1974—pp. 1–5.

Welzenbach et al.—The Application of Optical Systems for Cable TV NTG Fachber (Germ.), vol. 73, 1980, pp. 46–50.

(List continued on next page.)

*Primary Examiner*—Joseph A. Orsino, Jr.
*Attorney, Agent, or Firm*—Spencer & Frank

[57] ABSTRACT

A service integrated transmission system for transmitting, over a light transmission path, digital signals having a transmission band whose upper limit frequency corresponds to the maximum bit rate of the signals to be transmitted, the transmission being effected by simultaneously transmitting, over the transmission path, digital signals having a high bit rate only in an upper part of the transmission band and digital signals having a low bit rate only in a lower part of the transmission band. The system includes a transmitter at one end of the path which separately multiplexes low bit rate signals into a narrowband signal and high bit rate signals into a broadband signal, combines those multiplexed signals, and modulates a light source with the combined signal. A receiver at the other end of the path converts the modulated light signal into a demodulated electrical signal, separates the two multiplexed signals, and then demultiplexes each of the latter signals.

14 Claims, 2 Drawing Figures

OTHER PUBLICATIONS

Hinoshita et al.—Optical Fiber Two-Way Wavelength Division Multiplex Video Transmission System, Conf. 3rd World Telecomm. Forum Geneva (Sep. 19-26, 1979), pp. 3.2.4/1-3.

Cotten et al.—Fiber Optic Digital Video Systems for Commercial TV Trunking Applications—Conf. Proc. SPIE Wash., DC, Mar. 28-29, 1978, pp. 53-62.

Miki et al.—Two Way WDM Transmission—European Conf. on Optical Comm. 4th (Genoa) 1978, pp. 646-655.

"Contrasting Fiber-Optic-Component-Design Requirements in Telecommunications, Analog, and Local Data Communications Applications" by Personick et al., Proceedings of the IEEE, vol. 68, No. 10, Oct. 1980, pp. 1254 to 1262.

H. Schussler, "Einfluss und Anforderungen Neuer Dienste an Die Ortsnetze", Rev. FITCE, vol. 18, No. 2, Mar./Apr. 1979.

Hans Schüssler, "Dienstintegrierter Teilnehmeranschlussmit Lichtwellenleitern", [Service Integrated Subscribers Set with Light Wave Conductors], Wiss Ber AEG-Telefunken 53, 1980, pp. 72-79 and 1-21.

Keith Y. Chang, "Fiberguide Systems in the Subscriber Loop", Proceedings of the IEEE, vol. 68, No. 10, Oct. 1980.

Helmut Bauch, Future Communication Technology Using Optical Conductors, 1979.

"Basic Principles of Digital Subscriber Sets" by P. Hirschmann et al., *IEEE Transactions on Communications*, vol. Com. 29, No. 3, Feb. 1981, pp. 173-177.

"Low-Loss Access Coupler for Multimode Optical Fiber Distribution Networks" by B. S. Kawasaki et al., *Applied Optics*, vol. 16, No. 7, Jul. 1977, pp. 1794-1795.

"Direct Modulation of Double-Hetero-Structure Lasers at Rates up to 1 Gbit/s" by M. Chown et al., *Electronics Letters*, vol. 9, No. 2, Jan. 25, 1973, pp. 34 to 36.

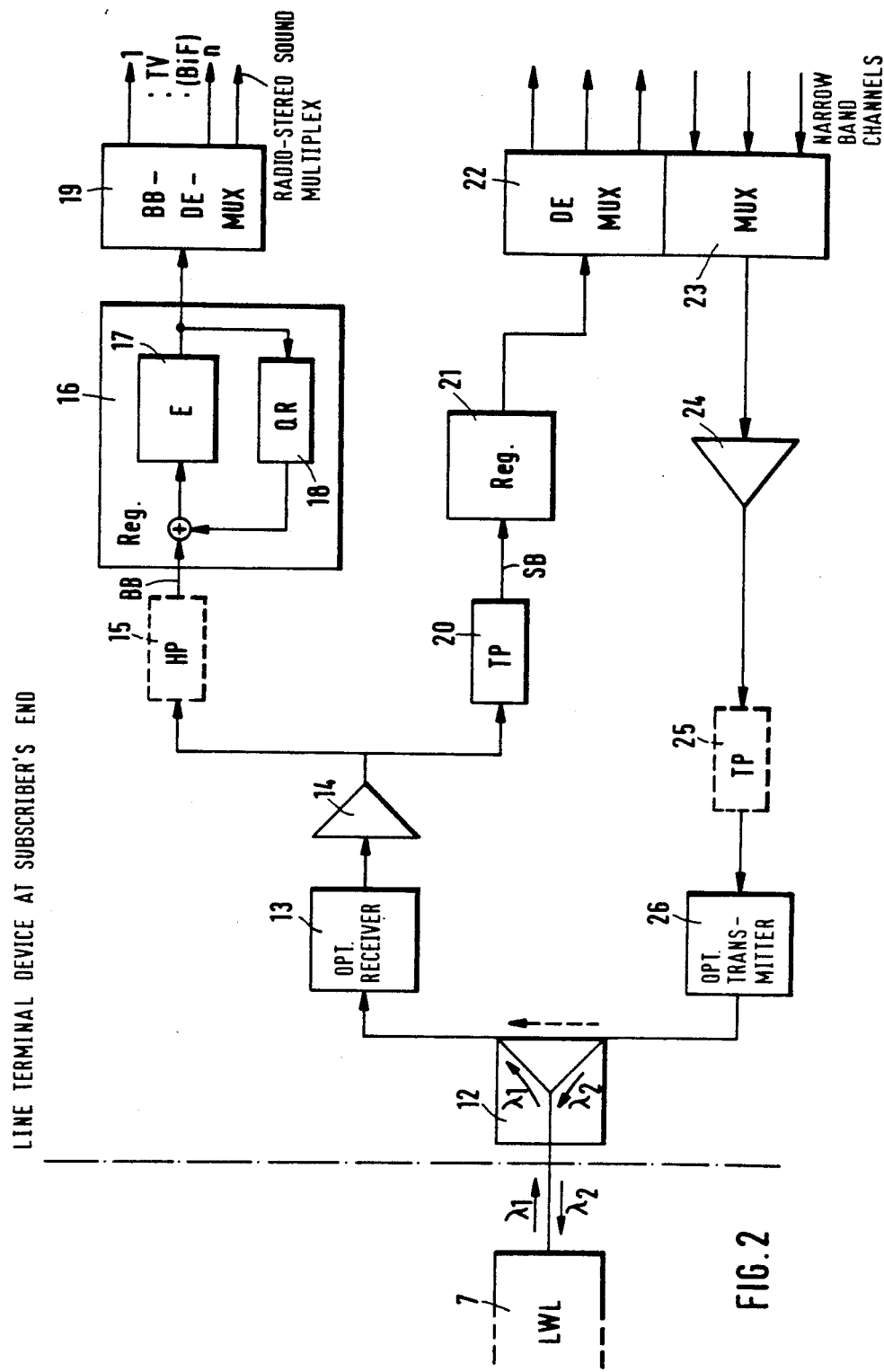

SERVICE INTEGRATED DIGITAL TRANSMISSION SYSTEM

BACKGROUND OF THE INVENTION

The present invention relates to a service integrated digital transmission system of the type employing conducted light radiation transmission.

German Offenlegungsschrift [Laid-open Application] No. 2,538,638 discloses an integrated communications system for the transmission and switching of video, audio and data signals, wherein the subscriber terminal is connected to the associated central exchange by means of two separate glass fibers, one fiber being used for transmission and the other for reception of telephone and video signals in time multiplex. Optionally, video coupling fields are provided for video communications or for switching in television signals.

U.S. Application Ser. No. 155,132, filed May 30, 1980, discloses a service integrated communications transmission and switching system for audio, video and data signals in which only one light conductive fiber is used for the subscriber terminal line and wherein narrowband service is provided by digital transmission and multiplexing at the subscriber end, and broadband service is provided by means of an analog transmission. In this system, the wave multiplex method is proposed for two-way transmissions which, however, places high demands on the optical transmission and receiving elements as well as the couplers with respect to cross-talk attenuation.

European Patent Application EP No. 0 012 979 A1 discloses a method for transmitting a plurality of signals over one lightwave conductor connection, particularly between a central office and a subcriber terminal, wherein television signals, a video telephone signal, monaural and stereo audio signals and a digital telephone signal are pulse position modulated and combined into a time multiplex signal. It is proposed to build a frame for the time multiplex signal to be transmitted in dependence on the simplest possible multiplexer and demultiplexer structure as well as a frame wherein a pulse of the lower channel is given a comparatively longer time rise. It is further proposed to combine the audio signals into a frequency multiplex signal and to likewise reshape this signal into a pulse position modulated signal.

SUMMARY OF THE INVENTION

It is an object of the present invention to provide a service integrated digital transmission system of the above type which permits the transmission of narrowband and broadband signals over a single optical channel, or path, in such a manner that it is possible to construct or expand the system in a modular manner. A further object of the invention is to permit modular construction with the fewest possible components for the transmission operation of the narrowband channels and with components having the lowest possible energy consumption. An additional object of the invention is to make possible limited operation, i.e. operation of the narrowband channels, for the longest possible period of interruption of the mains supply current. Another object of the invention is to permit a reduction in the requirements to be met by the optical components, while maintaining a high transmission quality. Yet another object of the invention is to make the system as inexpensive as possible.

The above and other objects are achieved, according to the invention, in a service integrated transmission system, including a first terminal containing a transmitter, a second terminal containing a receiver, and a transmission path connecting the terminals together, for transmitting, over the transmission path, digital signals having a transmission band whose upper limit frequency corresponds to the maximum bit rate of the signals to be transmitted, the transmission being effected by simultaneously transmitting, over the transmission path, digital signals having a high bit rate only in an upper part of the transmission band and digital signals having a low bit rate only in a lower part of the transmission band, by: constituting the transmission path as a light signal transmission path; constituting the transmitter by first signal supply means for supplying a plurality of individual signals having a low bit rate as narrowband signals, second signal supply means for supplying a plurality of individual signals having a high big rate as broadband signals, first multiplexing means connected to the first signal supply means for combining the plurality of low bit rate signals into a narrowband multiplex signal, second multiplexing means connected to the second signal supply means for combining the plurality of high bit rate signals into a broadband multiplex signal, adding means connected to the first and second multiplexing means for additively combining the narrowband and broadband multiplex signal into a combined multiplex signal having an associated frequency band in which the broadband multiplex signal occupies an upper part of the frequency band and the narrowband multiplex signal occupies a lower part of the frequency band, and light signal generating means connected between the adding means and the light signal transmission path for converting the combined multiplex signal into a light signal and conducting the light signal to the light transmission path; and constituting the receiver by light signal receiving means optically coupled to the light transmission path for converting the light signal transmitted over that path into an electrical signal, corresponding to the broadband signal formed by the adding means, signal separating means connected to the receiving means for separating the electrical signal into a low frequency component containing the narrowband multiplex signal and a high frequency compoent containing the broadband multiplex signal, and demultiplexing means connected to the signal separating means for separating each of the broadband and narrowband signals into a respective individual signal corresponding to those supplied by the signal supply means.

The transmission system according to the invention is designed according to a modular concept and thus permits a stepwise construction based on narrowband or broadband transmission with a high transmission quality. The number of optical systems and the requirements to be met by these systems are reduced. Due to the modularity of the system it is possible that, if there is an interruption in the mains supply current, operation of a certain group of channels can be maintained for a long period of time. Synchronism between narrowband signals and broadband signals is not necessary.

BRIEF DESCRIPTION OF THE DRAWING

FIG. 2 is a block circuit diagram of a second portion of a preferred embodiment of the system constituting a line terminal device at the subscriber's end.

DESCRIPTION OF THE PREFERRED EMBODIMENTS

Figure 1:
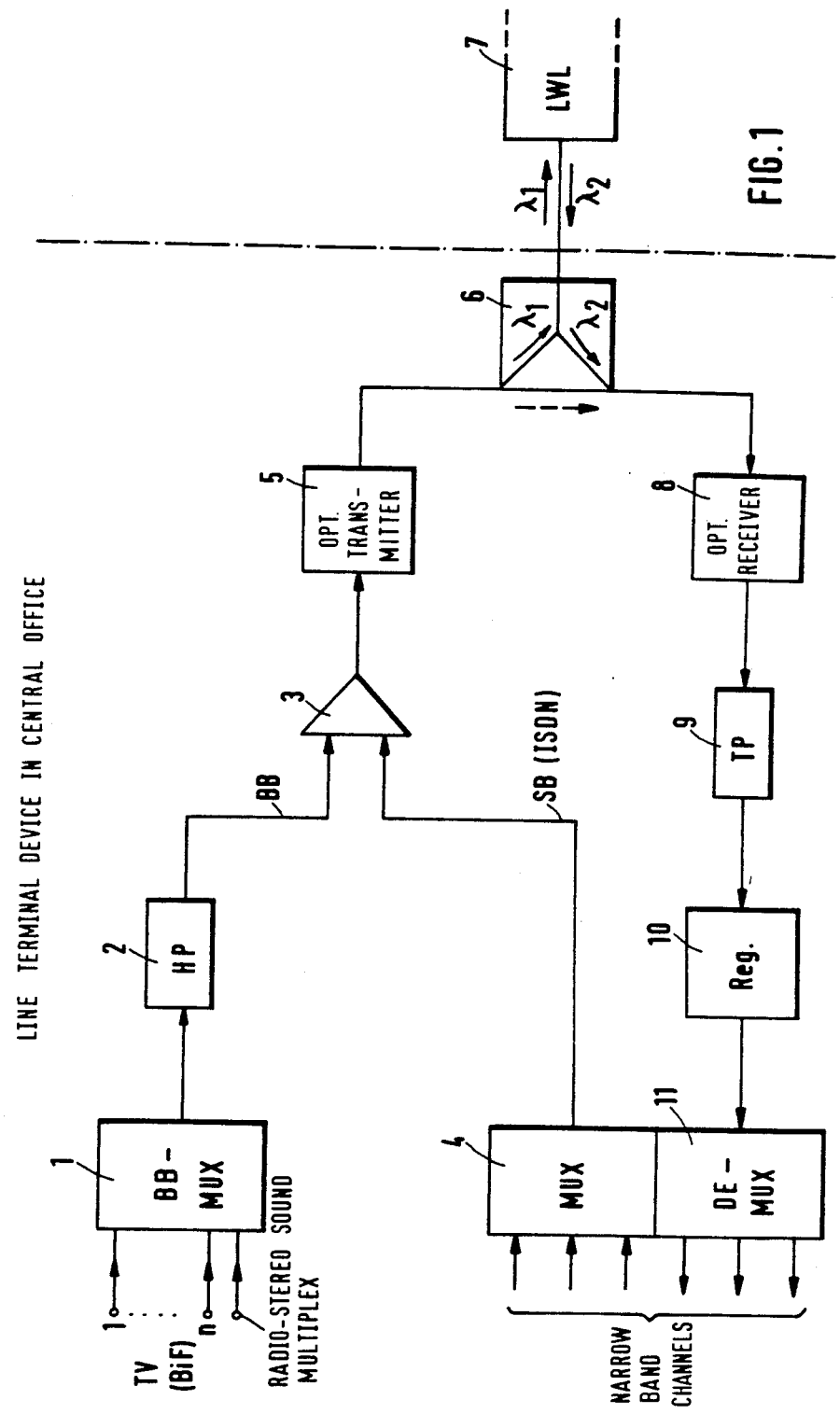
FIG. 1 is a block circuit diagram of one preferred embodiment of a portion of a system according to the invention constituting a line terminal device in a central office.

FIG. 1 shows on the left the separate processing components for narrowband channels, which include telephone, telex facsimile etc., these components including a multiplexer MUX 4 and a demultiplexer DEMUX 11, and, for processing the broadband channels which include television TV, audio radio programs and videotelephone BiF, a broadband multiplexer BBMUX 1.

Digital narrowband multiplex signals SB (ISDN) emitted by the narrowband multiplexer 4 are fed, via a first input of an amplifier 3, to an electrical-to-optical converter and transmitter 5 which is composed of a light emitting diode producing a light signal that is supplied via an optical fiber waveguide 7 to the subscriber. The broadband signals tv (Bif) 1 . . . n, radio stereo sound multiplex, etc., are multiplexed by the broadband multiplexer 1 into a signal having a high bit rate which travels through a highpass filter HP 2 to a second input of amplifier 3 and this latter signal is superposed in a higher frequency band over the low frequency, narrowband multiplex signal. The lower limit frequency of the highpass filter 2 must be selected, according to the present invention, to be higher than the bit rate of the narrowband multiplex signal. On the other hand, selection of a suitable code for the broadband signals will take care that not much power is present at frequencies below this limit frequency. for the whole page In the incoming direction, the optical signals travel through the optical fiber waveguide 7 to an optical-to-electrical converter and receiver 8 from whose electrical output signal the narrowband signals are filtered out in a lowpass filter TP 9 to be subsequently regenerated in a regenerator 10 and separated with respect to their corresponding channels in the subsequent demultiplexer 11. In this embodiment of the invention, no broadband operation is intended in the return direction.

According to an advantageous embodiment of the invention, two-way transmission takes place by means of light wavelength multiplexing where operation in the transmitting direction takes place at a wavelength of $\lambda 1$ and in the receiving direction at a wavelength of $\lambda 2$. For this purpose, a photocoupler 6 is included between the optical fiber waveguide 7 and the optical transmitter 5 and receiver 8, respectively. In order to reduce crosstalk even further, and to reduce the demands for the degree of decoupling of the photocoupler 6, a receiving wavelength of $\lambda 2 > \lambda 1$ is selected and receiver 8 is composed of a photodiode whose lower limit wavelength is greater than $\lambda 1$.

In FIG. 2, the light signal travels from the central exchange via the optical fiber waveguide 7 to an optical receiver 13 whose output signal is divided into individual frequency bands by means of a lowpass filter 20 which passes only the narrowband multiplex signal SB and blocks the broadband multiplex signal BB. The narrowband multiplex signal SB is regenerated in a regenerator 21 and thereafter separated by a demultiplexer 22 into the individual narrowband channels. The broadband multiplex signal passes through a highpass filter 15, which is not absolutely necessary, to a regenerator 16 composed of a decider 17 and a quantized feedback element 18 and the regenerated broadband signal is passed to a broadband demultiplexer 19 which recovers the individual broadband channels.

In the transmitting direction at the subscriber terminal, the narrowband channels of the subscriber are combined by means of a multiplexer 23 and fed to an amplifier 24 whose output signal is fed, via a lowpass filter 25, which is not absolutely necessary, to an electrical-to-optical converter and transmitter 26 which again includes a light emitting diode that produces a light signal which is supplied to the optical fiber waveguide 7. A directional photocoupler 12 corresponding to photocoupler 6 of FIG. 1 is included between the transmitter 26 and receiver 13, respectively, and the optical fiber waveguide 7. In order to reduce the requirements for the degree of decoupling, a photodiode having a bandpass property with an upper limit wavelength less than $\lambda 2$ is advantageously selected for the receiver 13.

The filter circuits for the highpass filter 15 and/or the lowpass filter 25, respectively, are not required in principle for practice of the invention but they provide greater attenuation on the transmission path and thus greater field lengths.

The present invention is not limited to wave multiplexing; it can also be realized in a favorable manner according to the burst mode transmission, which is disclosed in JSSLS 80, NTG Fachberichte, 73, pp. 26–30 by Bosik "The case in favor of burst-mode-transmission for Digital subscriber loops".

Particularly favorable conditions with respect to the manufacturing costs for practical embodiments of the lowpass and highpass filters, with respect to crosstalk attenuation in couplers 6 and 12 and with respect to the required dynamic range of the optical elements, result, however, when a combination of the time separated position method and wavelength multiplex is selected.

The optical receivers, amplifiers and regenerators 10,21 are described in "Contrasting Fiber-Optic-Component-Design Requirements . . . " by Personick in Preceeding of the IEEE, Vol. 68, No. 10, pp. 1254–1262. The regenerator 16 is described in IEEE Com-22, No. 1, 1974, pp. 1–5. The optical transmitters are described in "Direct modulation of DHS-Lasers" by Chown in Electronics letters 1973 Vol. 9, No. 2 pp. 34–38 Optical couplers are those as mentioned in Applied Optics/Vol. 16 No. 7/1977 pp. 1794–1795.

Low and High pass filters 9,20,25 and 2,15 are characterized by 3 dB-cut-off frequencies of bit rate of narrowband multiplex signal SB and of bit rate of about ten times of the narrow band multiplex signal bit rate, respectively, wherein the filter grade is not critical.

The broadband multiplexers and demultiplexers 1 and 19 can be specified in CCITT-Recommandation G 751, if the TV-signals and the radio-stereo multiplex signal must have the common bit rate of 34 M bit/s.

The narrowband multiplexers 4,23 and demultiplexers 11,22 can be realised as shown in IEEE Com.-29 No. 2, 1981, pp. 173–177.

A great advantage of burst mode transmission is that the requirements of optical couplers can be immensely reduced. If burst mode transmission is combined with wave length multiplexing method the requirements for the optical couplers can be further reduced.

The separate multiplex formation or transmission, respectively, of the narrowband and broadband signals make possible a modular structure or modular expansion of the system in which, for example, broadband multiplexers or demultiplexers are necessary for the subscriber at the central exchange or at the subscriber's end, respectively, only if the subscriber is interested in broadband services. Narrowband multiplexers and demultiplexers can be fabricated much more simply and have lower power requirements. It is an additional advantage that during emergency operation current can be supplied to only those components which are necessary to maintain the telephone service.

It will be understood that the above description of the present invention is susceptible to various modifications, changes and adaptations, and the same are intended to be comprehended within the meaning and range of equivalents of the appended claims.

What is claimed is:

1. In a service integrated transmission system, including a first terminal containing a transmitter, a second terminal containing a receiver, and a transmission path connecting the terminals together, for transmitting, over the transmission path, digital signals having a transmission band whose upper limit frequency corresponds to the maximum bit rate of the signals to be transmitted, the transmission being effected by simultaneously transmitting, over the transmission path, digital signals having a high bit rate only in an upper part of the transmission band and digital signals having a low bit rate only in a lower part of the transmission band, the improvement wherein:

said transmission path is a light signal transmission path;

said transmitter comprises first signal supply means for supplying a plurality of individual signals having a low bit rate as narrowband signals, second signal supply means for supplying a plurality of individual signals having a high bit rate as broadband signals, first multiplexing means connected to said first signal supply means for combining the plurality of low bit rate signals into a narrowband multiplex signal, second multiplexing means connected to said second signal supply means for combining the plurality of high bit rate signals into a broadband multiplex signal, adding means connected to said first and second multiplexing means for additively combining the narrowband and broadband multiplex signals into a combined multiplex signal having an associated frequency band in which the broadband multiplex signal occupies an upper part of the frequency band and the narrowband multiplex signal occupies a lower part of the frequency band, and light signal generating means connected between said adding means and said light signal transmission path for converting the combined multiplex signal into a light signal and conducting the light signal to said light transmission path; and said receiver comprises light signal receiving means optically coupled to said light transmission path for converting the light signal transmitted over that path into an electrical signal, corresponding to the broadband signal formed by said adding means, signal separating means connected to said receiving means for separating the electrical signal into a low frequency component containing the narrowband multiplex signal and a high frequency component containing the broadband multiplex signal, and demultiplexing means connected to said signal separating means for separating each of the broadband and narrowband signals into a respective individual signal corresponding to those supplied by said signal supply means.

2. An arrangement as defined in claim 1 wherein: said first terminal further contains a second receiver including light signal receiving means optically coupled to said light signal transmission path; said second terminal further contains a second transmitter including light signal generating means optically coupled to said light signal transmission path; and said system further comprises means for permitting two-way light signal transmission between said terminals.

3. An arrangement as defined in claim 2 wherein said means permitting two-way transmission operate according to the burst mode transmission.

4. An arrangement as defined in claim 2 wherein said means permitting two-way transmission cause transmission in each direction to be at a respectively different light wavelength.

5. An arrangement as defined in claim 4 wherein said light signal transmission path is constituted by a single path between said transmitter and said receiver and said means for permitting two-way light signal transmission comprise a respective optical couple at each said terminal coupling said transmission path to said transmitter and receiver of its associated terminal, and each said receiver is substantially insensitive to the wavelength of the light signal produced by said light signal generating means of said transmitter of its associated terminal.

6. An arrangement as defined in claim 2 wherein said second transmitter comprises means producing a further multiplex signal, and said second receiver comprises second demultiplexing means for demultiplexing the further multiplex signal, and signal regenerator means connected between said light signal receiving means of said second receiver and said second demultiplexing means.

7. An arrangement as defined in claim 6 wherein said regenerator means comprise means providing a quantized feedback.

8. An arrangement as defined in claim 2 wherein said second transmitter comprises a light emitting diode.

9. An arrangement as defined in claim 1 or 2 wherein all of said means contained in said second terminal are connected to be normally supplied with operating power by local power supply mains, and further comprising an emergency power supply connected for supplying operating power to those said means contained in said second terminal which are associated with narrowband signals in case of failure of the local power supply mains.

10. An arrangement as defined in claim 1 wherein said transmitter further comprises a highpass filter interposed between said second multiplexing means and said adding means for limiting the frequency range of the broadband multiplex signal to the upper part of the frequency band.

11. An arrangement as defined in claim 1 or 10 wherein said receiver further comprises a lowpass filter connected between said separating means and said demultiplexing means for passing only the narrowband multiplex signal.

12. An arrangement as defined in claim 1 wherein said receiver further comprises signal regenerator means interposed between said light signal receiving means and said demultiplexing means.

13. An arrangement as defined in claim 12 wherein said regenerator means comprise means providing a quantized feedback.

14. An arrangement as defined in claim 1 wherein said transmitter comprises a light emitting diode.

* * * * *